July 14, 1925. 1,545,826

F. P. GALLI

PEANUT HULLING MACHINE

Filed April 9, 1924 3 Sheets-Sheet 1

Witness:

Inventor:
Frank P. Galli
By Wilson Atty

July 14, 1925.  1,545,826

F. P. GALLI

PEANUT HULLING MACHINE

Filed April 9, 1924  3 Sheets-Sheet 2

Witness:

Inventor
Frank P. Galli

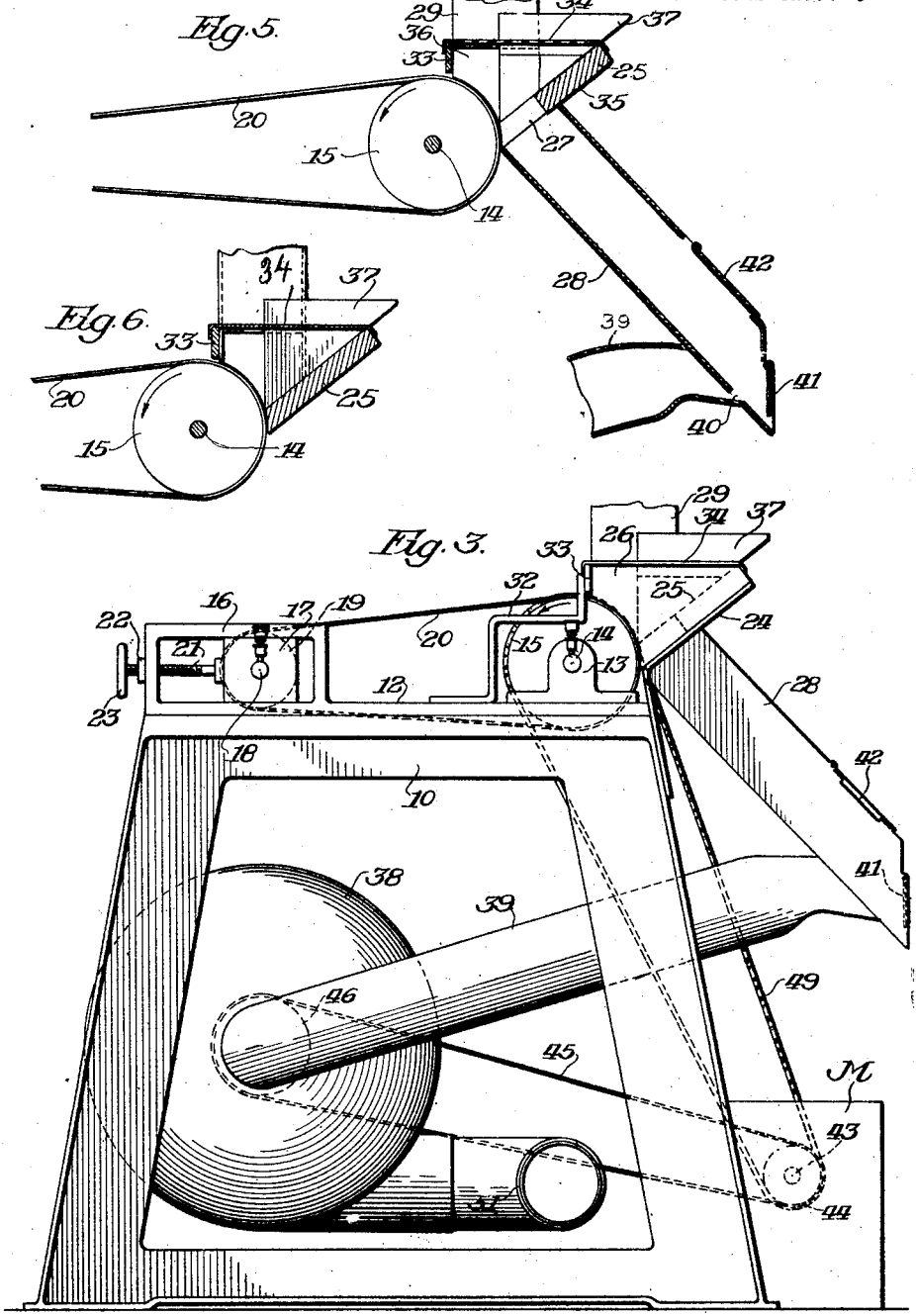

Patented July 14, 1925.

1,545,826

UNITED STATES PATENT OFFICE.

FRANK P. GALLI, OF CHICAGO, ILLINOIS, ASSIGNOR TO PEANUT SPECIALTY CO., OF CHICAGO, ILLINOIS, A CORPORATION OF ILLINOIS.

PEANUT-HULLING MACHINE.

Application filed April 9, 1924. Serial No. 705,212.

*To all whom it may concern:*

Be it known that I, FRANK P. GALLI, a citizen of the United States, residing at Chicago, in the county of Cook and State of Illinois, have invented certain new and useful Improvements in Peanut-Hulling Machines, of which the following is a specification.

This invention relates to machines designed to remove the hulls or skins from shelled nuts, and more particularly peanuts. The machine is based upon the broad principle of subjecting the nuts to a combined tumbling and attrition action while conveying them through a trough; the skins or hulls for the most part being removed by the action of a roughened surface moving in a direction at right angles to the path of travel of the nuts through the trough, such moving surface preferably taking the form of a sanded apron or broad belt. As an auxiliary hull-separating device for removing such portion of the hulls as are not carried off by the principal hull-removing agency I preferably employ a fan and suction tube communicating with the nut discharge conduit which extends downwardly from the discharge end of the trough.

The main object of the invention is to provide an improved, simplified and highly efficient machine for effecting the hulling or blanching of peanuts and other nuts which commonly require to have the hulls or skins removed preliminary to placing them on the retail market. Other more specific objects and attendant advantages of the invention will be apparent to those skilled in the art from the following detailed description, taken in connection with the accompanying drawings in which I have illustrated one practical and approved embodiment of the invention, and wherein—

Figure 1:
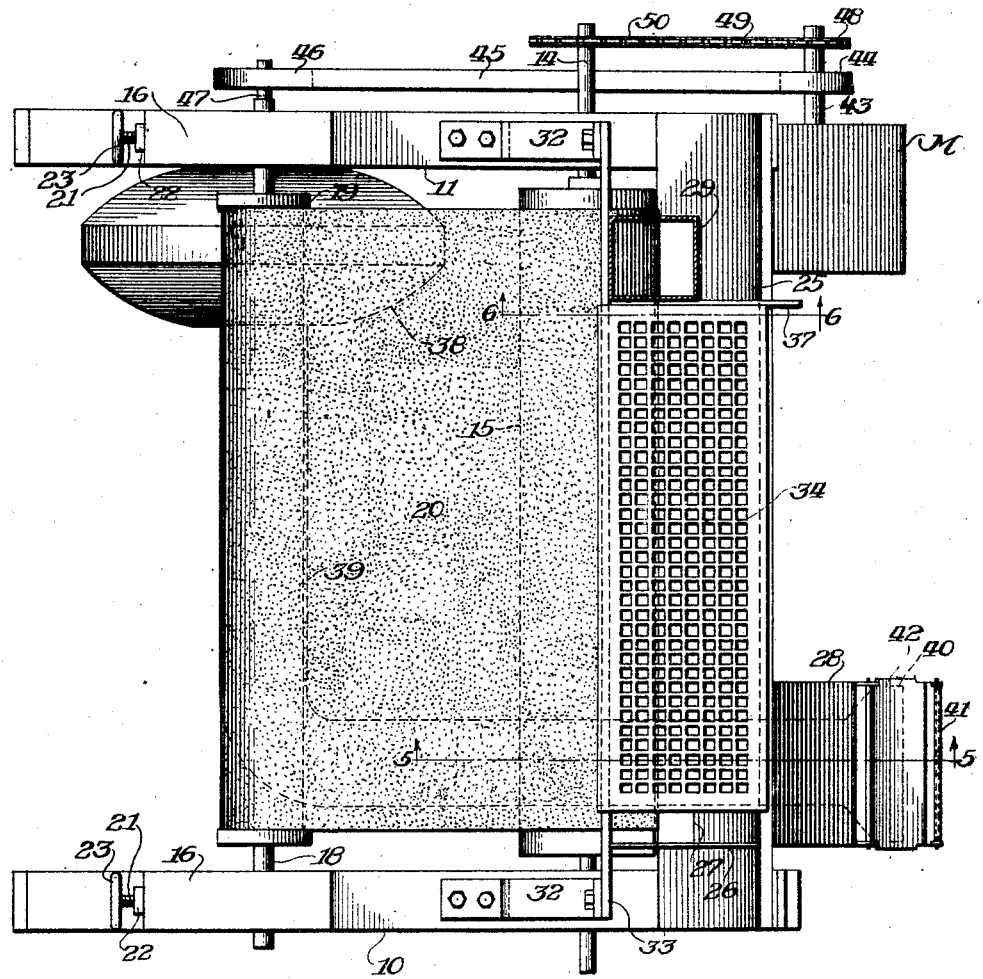
Figure 4:
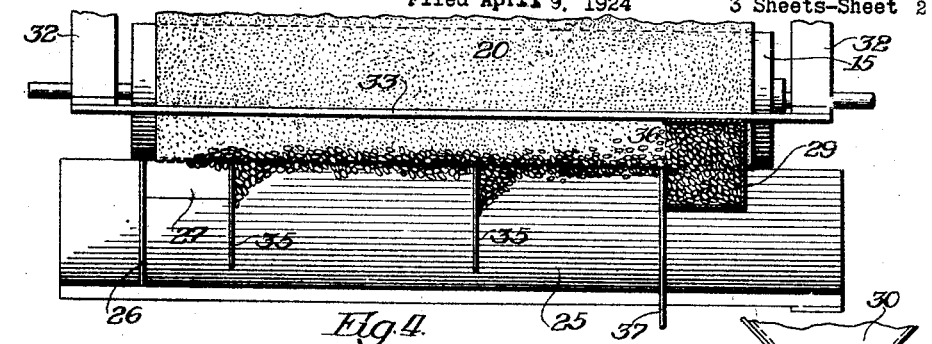
Figure 2:
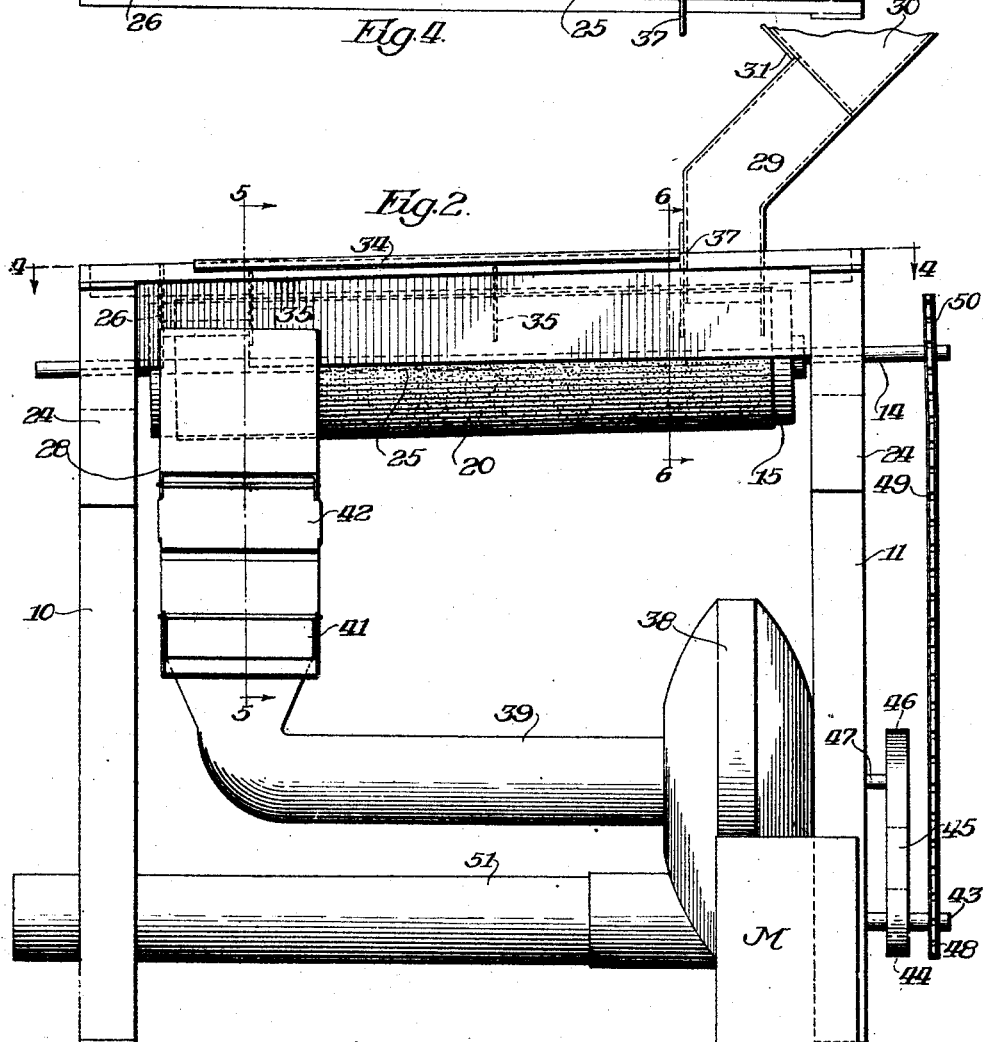

Fig. 1 is a top plan view of the machine;
Fig. 2 is a front elevation thereof, viewed from the right of Figs. 1 and 3;
Fig. 3 is a side elevation viewed from the left of Fig. 2;
Fig. 4 is a top plan, partly in horizontal section, on the line 4—4 of Fig. 2, of the trough, with the perforated cover-plate of the trough removed;
Fig. 5 is a transverse section taken on the line 5—5 of Figs. 1 and 2; and
Fig. 6 is a transverse section taken on the line 6—6 of Figs. 1 and 2.

Referring to the drawings, 10 and 11 designate respectively a pair of upright side frame members, on and between which the principal operating parts of the machine are mounted. On each of the side frame members 10 and 11 is mounted a strip or plate 12 (Fig. 3), on the forward end of which is mounted a bearing 13. In and between the bearings 13 is journaled the shaft 14 of a roll 15 constituting a movable side of a trough hereinafter more fully described. By reference to Fig. 2 it will be observed that the shaft 14 of the roll 15 is not quite horizontal, but is slightly inclined from the feed to the delivery end of the trough, so as to facilitate the gradual passage of the nuts by gravity from the high to the low end of the trough. At the rear of the strips or plates 12 are formed rectangular slideways 16 (Fig. 3) in which are mounted blocks 17 that provide journals for the shaft 18 of a rear roll 19 of somewhat less diameter than the front roll 15. Over and between the rolls 15 and 19 extends an endless broad belt or apron 20, the outer surface of which is preferably roughened as by sand-coating the same. A proper tension of the apron is maintained by adjusting screws 21 swiveled in the bearing blocks 17 and engaged with stationary nuts 22 on the rear of the slideways 16; said screws being equipped with hand wheels 23.

Mounted on angle brackets 24 attached to the forward edges of the side frames 10 and 11 is an inclined board 25 that forms the stationary wall of the trough, the movable wall of which is formed by the roll 15 and apron 20; the lower edge of the board 25 just clearing the surface of the apron, as clearly shown in Figs. 5 and 6. The board 25 has a longitudinal inclination corresponding to that of the roll 15, and the low end of the trough formed by the board and roll is closed by an end cover-plate 26. Just inwardly of the cover-plate 26 the wall 25 of the trough is provided with a discharge opening 27 that communicates with the upper end of a downwardly and forwardly inclined nut discharge conduit 28.

Communicating with the other or high end of the trough is the lower end of a feed conduit 29, which feed conduit communicates at its upper end with the lower end of a hopper 30 filled with the nuts to be hulled. Controlling the opening from the hopper into the feed conduit is a sliding door 31 that, by its position relatively to the opening controls the rate of feed from the hopper into the feed spout or conduit. On the strips or plates 12 are mounted a pair of bent bars 32 (Figs. 1 and 3) overhanging the bearings 13 and forming end supports for a baffle strip 33 that extends above and parallel with the roll 15, being spaced about a sixteenth of an inch from the surface of the apron on said roll. The function of this bar is to block the passage of the nuts upwardly over the roll, which latter turns in the direction indicated by the arrows in Figs. 3, 5 and 6, while permitting the loosened hulls that cling to the rough surface of the apron to pass beneath the baffle strip and be carried to the rear by the apron. Supported upon the upper edges of the trough wall 25 and the baffle strip 23 is a removable perforated sheet metal cover-plate 34 that extends from the feed chute 29 to the opposite or discharge end of the trough.

Mounted crosswise of the trough wall 25 between the receiving and discharge ends of the trough are a plurality of triangular strips 35 that constitute baffle plates to retard the travel of the nuts down the trough and increase the tumbling and rubbing effect thereon by which the loosened skins are dislodged from the kernels. The inner side wall of the feed spout 29 is cut away at its lower end beneath the cover-plate 34 to form an opening 36 (Figs. 4 and 5) through which the nuts are delivered from the spout into the trough. The size of this opening may be regulated by a slide 37 resting on the trough wall 25 and confined between the side of the spout 29 and the adjacent end of the cover-plate 34.

Provision is made for carrying off by suction such portion of the hulls or skins as are not carried off by the apron 20 during the travel of the nuts through the trough. The means for effecting this comprises a rotary fan or blower 38 mounted on the inner side of the frame member 11 and a suction pipe 39 leading from the eye of the blower casing to the lower side of the discharge trough 28. As shown in Fig. 5, the suction pipe 39 communicates with the nut discharge conduit 28 through an opening or passage 40 sufficiently narrow to prevent the kernels from being drawn off through the pipe 39, but wide enough to allow the easy passage therethrough of the hulls and hull fragments. On the lower end of the discharge chute 28 is a suspended valve 41 which swings open under the weight of the nuts sufficiently to allow the passage of the latter, and at the same time sufficiently restricts the inward flow of air to make the suction effective upon the hulls falling through the discharge chute. The back of the chute is preferably provided with an opening normally closed by a hinged cover 42, by opening which any clogging of the nuts at the lower end of the chute may readily be remedied.

The moving parts of the machine are driven from an electric motor M through the following instrumentalities. The armature shaft 43 of the motor carries a pulley 44 connected by a belt 45 to a pulley 46 on the fan shaft 47. The armature shaft 43 also carries a sprocket wheel 48 which, through a sprocket chain 49 drives a sprocket wheel 50 fast on the shaft 14 of the apron roll 15. The casing of the fan 38 is provided with the usual tangential discharge pipe 51 through which the abstracted hulls are discharged.

In the operation of the machine, the nuts to be hulled or blanched are supplied into the hopper 30 and, in a stream roughly regulated as to volume by the sliding door 31, the nuts flow by gravity through the feed chute 29 and thence into the receiving end of the trough through the opening 36, the feed being further regulated by the adjustment of the sliding valve 37. Power being applied, the apron 20 forming the movable wall of the trough travels upwardly as indicated by the arrows in Figs. 3, 4 and 5, and the nuts are tumbled and rubbed thereby, thus loosening and breaking the hulls, and gradually descend the slightly inclined trough. They tend to pile up more or less in front of the baffle plates 35 but gradually work past the baffle plates to the discharge opening 27. During this travel of the nuts through the trough, the greater part of the loosened hulls cling to the rough surface of the apron 20 and are abstracted by the latter through the narrow opening between the surface of the belt and the lower edge of the baffle strip 33. The kernels, accompanied by a small proportion of the hulls not carried off by the apron fall in a continuous stream through the discharge port 27 into and down the discharge chute 28, piling up in front of the discharge valve 41 and by their weight gradually opening and passing the latter. The sucton blast through the pipe 39 operates to draw off the greater part of the hulls and hull fragments that enter the chute 28, so that the kernels as delivered are comparatively free from hulls and other chaff. The hulls carried off by the belt 20 are discharged by gravity from the tail-end of the belt on the rear side of the roll 19. The tension of the belt may be regulated and slack, as the machine wears, taken up by manipulation of the hand screws 21 in an obvious manner.

The perforated cover-plate 34 is principally useful to prevent the nuts from jumping out of the trough during the tumbling operation.

While I have herein shown and described one practical and efficient embodiment of the invention, it is manifest that the specific details thereof may be considerably varied and modified without departing from the principle of the invention or sacrificing any of the advantages thereof. Hence, I reserve all such variations and modifications as fall within the spirit and purview of the appended claims.

I claim—

1. In a peanut hulling machine, the combination of an endless traveling apron having a rough outer surface, and means for causing nuts to engage said apron whereby the hulls are removed therefrom, said endless belt presenting an upper flat surface of considerable length and width capable of performing the function of a picking table.

2. In a peanut hulling machine, the combination of a trough including a transversely movable wall formed by an endless apron having a rough surface adapted to pick up hulls, a feed chute communicating with one end of said trough and a discharge chute communicating with its other end, said endless belt presenting an upper flat surface of considerable length and width capable of performing the function of a picking table.

3. In a peanut hulling machine, the combination of a longitudinally inclined trough one wall of which is formed by a traveling apron having a rough surface adapted to pick up hulls, means for feeding the nuts into the high end of said trough, and means for discharging the hulled nuts from the low end of said trough, said endless belt presenting an upper substantially flat supporting surface of considerable area to convey hulls to a point remote from the trough.

4. In a peanut hulling machine, the combination of a longitudinally inclined trough including a traveling apron having a rough surface adapted to pick up hulls, a feed chute communicating with the high end of said trough, and a discharge chute communicating with its low end, said endless belt presenting an upper substantially flat supporting surface of considerable area to convey hulls to a point remote from the trough.

5. In a peanut hulling machine, the combination of a longitudinally inclined trough formed with a transversely movable wall having a rough surface adapted to pick up hulls, one or more baffles disposed crosswise of said trough to retard the longitudinal movement of the nuts within the trough, and a feed chute communicating with the high end of said trough.

6. In a peanut hulling machine, the combination of a roll, a board located obliquely opposite to and parallel with said roll and forming with the latter a generally V-shaped trough, an apron trained over said roll and having a rough surface to pick up hulls, means for driving said roll, and means for feeding nuts into one end of said trough.

7. In a peanut hulling machine, the combination of an inclined roll, a board located obliquely opposite to and parallel with said roll and forming with the latter a generally V-shaped trough, an apron trained over said roll and having a rough surface to pick up hulls, means for driving said apron upwardly over said roll, and means for feeding nuts into the high end of said trough.

8. In a peanut hulling machine, the combination of an inclined roll, a board located obliquely opposite to and parallel with said roll and forming with the latter a generally V-shaped trough, one or more baffle-plates mounted on and crosswise of the inner side of said board, an apron trained over said roll having a rough surface to pick up hulls, means for driving said apron upwardly over said roll, and a feed chute communicating with the high end of said trough.

9. In a peanut hulling machine, the combination of an inclined roll, a board located obliquely opposite to and parallel with said roll and forming with the latter a generally V-shaped trough, an apron trained over said roll and having a rough surface to pick up hulls, a baffle bar extending parallel with and spaced a small distance above the top of said roll, means for driving said apron upwardly over said roll, and a feed chute communicating with the high end of said trough.

10. In a peanut hulling machine, the combination of an inclined roll, a board located obliquely opposite to and parallel with said roll and forming with the latter a generally V-shaped trough, one or more baffle plates mounted on and crosswise of the inner side of said board, an apron trained over said roll and having a rough surface to pick up hulls, a baffle-bar extending parallel with and spaced a small distance above the top of said roll, means for driving said apron upwardly over said roll, and a feed chute communicating with the high end of said trough.

11. In a peanut hulling machine, the combination of a longitudinally inclined trough including a transversely movable wall formed by an apron having a rough surface adapted to pick up hulls, and a stationary wall opposite to said movable wall formed with a discharge opening in its lower end, a feed chute extending into the high end of said trough formed with a lateral discharge opening, means for regulating the size of said discharge opening, and a discharge chute communicating with the discharge opening of said trough.

12. In a peanut hulling machine, the combination of a longitudinally inclined conveyor trough equipped with a transversely movable roughened wall and with baffles for tumbling the nuts and carrying off the hulls, a discharge chute communicating with the lower end of said trough, and a suction fan communicating with said discharge chute.

13. In a peanut hulling machine, the combination of a longitudinally inclined trough formed with a transversely movable wall having a rough surface adapted to pick up hulls, and a stationary transversely inclined wall opposite to said movable wall formed with a discharge opening in its lower end, a feed chute extending into the high end of said trough, a discharge chute communicating with the discharge opening of said trough, and a suction fan communicating with said discharge chute, said endless belt presenting an upper substantially flat supporting surface of considerable area to convey hulls to a point remote from the trough.

14. In a peanut hulling machine, the combination of a longitudinally inclined conveyor trough provided with means for tumbling the nuts and conveying off the hulls laterally of the trough, a downwardly extending discharge chute communicating with the lower end of said trough, a valve at the lower end of said discharge chute controlling the flow of nuts from the latter, and a suction fan communicating with said discharge chute at a point above said valve.

15. In a peanut hulling machine, the combination of a longitudinally inclined conveyor trough provided with means for tumbling the nuts and conveying off the hulls laterally of the trough, a downwardly extending discharge chute communicating with the lower end of said trough, a suction fan communicating with said discharge chute, and a perforated cover-plate for said trough.

16. In a peanut hulling machine, the combination of a longitudinally inclined conveyor trough having a roll forming one wall thereof, a second roll journaled opposite to and parallel with said first-named roll, an apron having a roughened surface extending over and between the said rolls, and means for driving one of said rolls.

17. In a peanut hulling machine, the combination of a longitudinally inclined trough having a roll forming one wall thereof, a second roll journaled opposite to and parallel with said first-named roll, an apron having a roughened surface extending over and between said rolls, means for bodily adjusting said second roll toward and from said first-named roll, and means for driving one of said rolls.

18. In a peanut hulling machine, the combination of a longitudinally inclined trough having a roll forming one wall thereof, a second roll journaled opposite to and parallel with said first-named roll, an apron having a roughened surface extending over and between said rolls, a discharge chute communicating with the lower end of said trough, a suction fan communicating with said discharge chute, a motor, and driving connections from said motor to said suction fan and to one of said rolls.

19. In a peanut hulling machine, the combination of a longitudinally inclined trough formed with a transversely movable wall having a rough surface adapted to pick up hulls, means within the trough to retard the longitudinal travel of the nuts down the trough and to increase the tumbling and rubbing effect on the nuts, and a feed chute communicating with the high end of the trough.

FRANK P. GALLI.